(12) United States Patent
Lee et al.

(10) Patent No.: US 6,754,469 B1
(45) Date of Patent: Jun. 22, 2004

(54) METHOD FOR REDUCING TEMPORAL CONNECTIONS AMONG BLUETOOTH DEVICES

(75) Inventors: Dae-sun Lee, Seoul (KR); Ki-young Choi, Anyang (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 515 days.

(21) Appl. No.: 09/688,238

(22) Filed: Oct. 16, 2000

(30) Foreign Application Priority Data

Dec. 27, 1999 (KR) ........................................ 1999-62767

(51) Int. Cl.⁷ ................................................. H04B 5/00
(52) U.S. Cl. ..................................... 455/41.2; 370/338
(58) Field of Search ............................. 455/41.2, 41.3, 455/517; 370/338, 349; 375/132, 133

(56) References Cited

U.S. PATENT DOCUMENTS

2002/0044554 A1 * 4/2002 Johansson et al. .......... 370/386
2002/0045454 A1 * 4/2002 Iwata .......................... 455/450
2003/0013473 A1 * 1/2003 Adachi et al. ............... 455/517
2003/0037033 A1 * 2/2003 Nyman et al. .................. 707/1

* cited by examiner

*Primary Examiner*—Lee Nguyen
(74) *Attorney, Agent, or Firm*—Sughrue Mion, PLLC

(57) ABSTRACT

A method for wireless communication, and more particularly, a method for reducing the number of temporal connections in Bluetooth devices when obtaining neighboring Bluetooth device names is provided. The method for reducing temporal connections in Bluetooth devices comprises determining whether other Bluetooth devices are present, obtaining a name by temporally connecting to a Bluetooth device whose presence has been determined and determining whether other Bluetooth devices are present after a predetermined time has passed, and then obtaining a changed name through a temporal connection only to other Bluetooth device whose name has been changed. According to the above method, blocking temporal connections to Bluetooth devices whose name has not changed according to changes in the UNDEF field of FHS packets enables a reduction in the frequency of temporal connections.

3 Claims, 4 Drawing Sheets

FIG. 3

| 34 | 24 | 2 | 2 | 2 | 8 | 16 | 24 | 3 | 26 | 3 |
|---|---|---|---|---|---|---|---|---|---|---|
| Parity bits | LAP | UNDEF | SR | SP | UAP | NAP | class of device | AM_ADDR | $CLK_{27-2}$ | page scan mode |

METHOD FOR REDUCING TEMPORAL CONNECTIONS AMONG BLUETOOTH DEVICES

BACKGROUND OF THE INVENTION

1. Field of the Invention

The present invention relates to a method for conducting wireless communication, and more particularly, to a method for reducing temporal connections in Bluetooth devices. This application is based on Korean Patent Application No. 99-62767 filed Dec. 27, 1999, which is incorporated herein by reference.

2. Description of the Related Art

Bluetooth is a specification in which data can be sent and received using a large bandwidth for communications in a variety of electronic devices using radio frequency without physical cables. At present, Internet access from a mobile communication terminal requires a terminal having a data communication function, a notebook computer, and a separate cable for connecting these two devices. However, if Bluetooth is commercialized, data communications between devices would be able to be conducted wirelessly, and Bluetooth-compliant devices, such as a Bluetooth-compliant digital camera, and a Bluetooth-compliant printer, would not need a cable connection.

In order for communications between devices operating in a Bluetooth communication environment to occur, a connection must be established. A process for establishing a connection includes synchronizing a radio frequency, establishing a link between link administrators of the communicating devices, and establishing a channel. Only after connection is completed, can character data, voice data, etc., be sent and received between two devices.

When a 1st Bluetooth device is to communicate with other (2nd-Nth) Bluetooth devices when a plurality of Bluetooth devices are in operation around the first Bluetooth device, the first Bluetooth device obtains addresses from the 2nd~Nth Bluetooth devices through an inquiry operation. However, because the 1st Bluetooth device cannot identify the 2nd~Nth Bluetooth devices with the address alone, the 1st Bluetooth device needs to obtain names of the other Bluetooth devices through a temporal connection.

In this situation, if any of the 2nd~Nth Bluetooth devices has a changed name, then the 1st Bluetooth device must ascertain the changed name through a temporal connection. For this, the 1st Bluetooth device must make frequent inquiries of the 2nd~Nth devices, and ascertain the names through temporal connections, which is a drawback in that it requires much time.

SUMMARY OF THE INVENTION

In order to solve the above problems, an objective of the present invention is to provide a method for reducing temporal connections in Bluetooth devices by blocking temporal connections to Bluetooth devices which need not change names.

Accordingly, to achieve the above objective of the present invention, there is provided a method for reducing temporal connections among wireless telecommunications devices, in which when a predetermined condition is met after obtaining a predetermined identifier and name for determining whether the wireless telecommunications devices are present, changed names are obtained from the wireless telecommunications devices without again setting the identifiers.

BRIEF DESCRIPTION OF THE DRAWINGS

The above objective and advantages of the present invention will become more apparent by describing in detail a preferred embodiment thereof with reference to the attached drawings in which:

FIG. 3 illustrates the format of a frequency hop synchronization (FHS) packet.

DETAILED DESCRIPTION OF THE INVENTION

Figure 1:
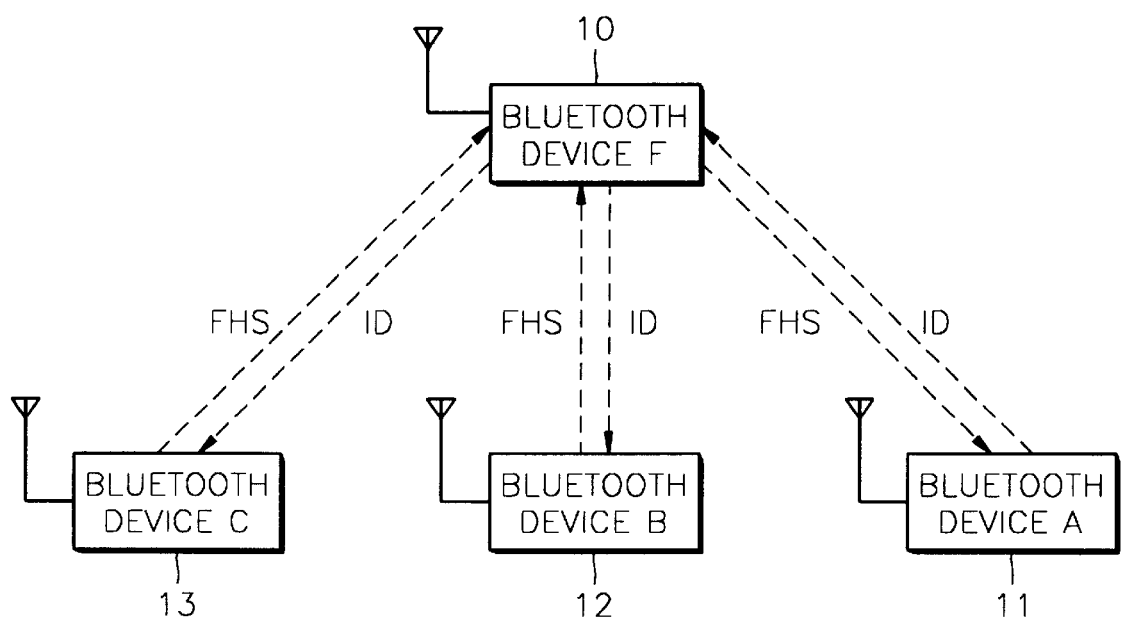
FIG. 1 illustrates an embodiment of a connection system among Bluetooth devices.

FIG. 1 illustrates an embodiment of a connection system among Bluetooth devices.

The system illustrated in FIG. 1 includes Bluetooth device F (10), Bluetooth device A (11), Bluetooth device B (12), and Bluetooth device C (13). In FIG. 1, it is assumed that Bluetooth device F obtains names by temporally connecting to Bluetooth devices A, B, C (11–13), respectively.

Figure 2:
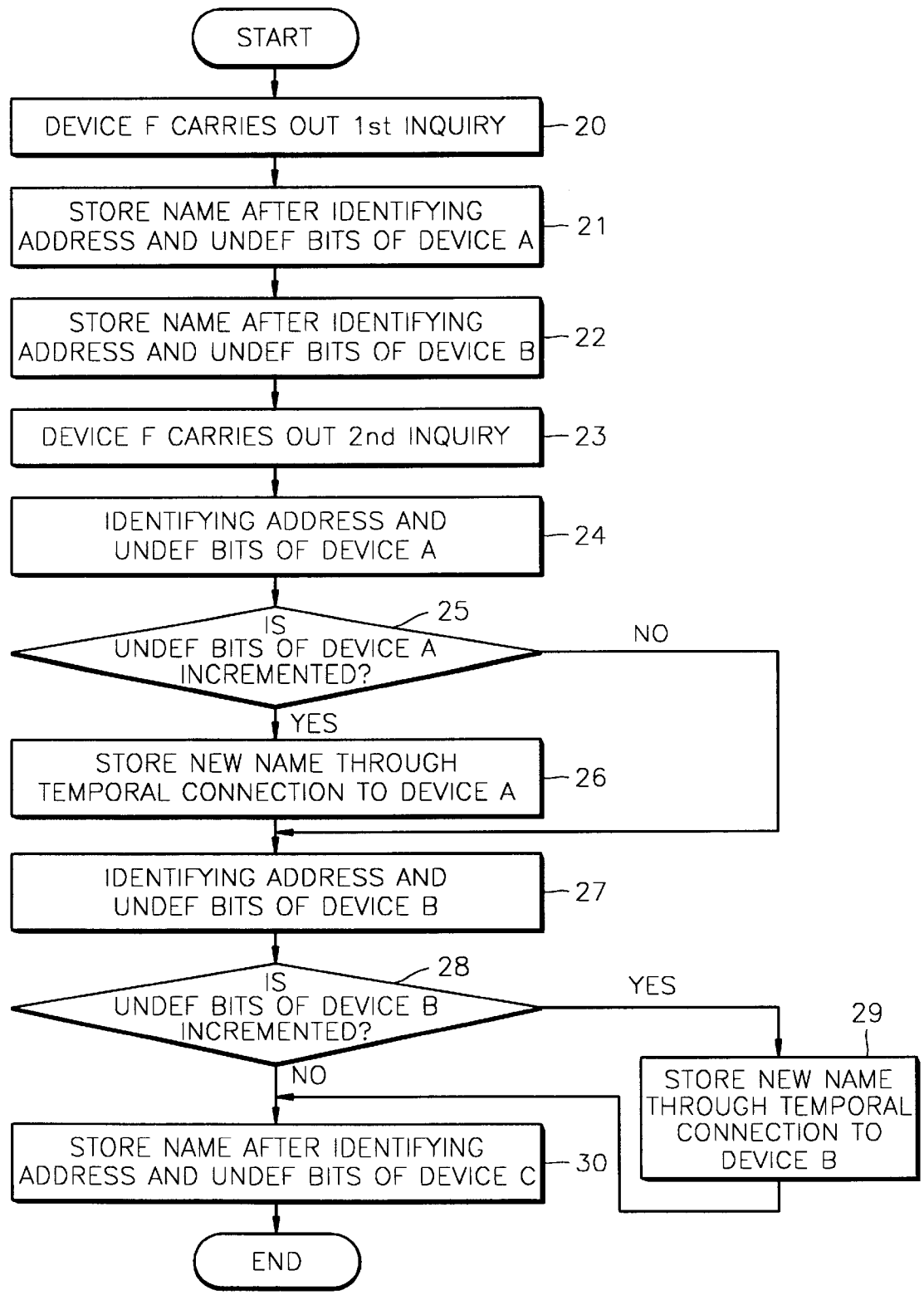
FIG. 2 illustrates a flow chart showing the operation of a method for reducing temporal connections among Bluetooth devices.

Referring to FIG. 2, device F (10) carries out a first inquiry in a step 20.

The inquiry operation carried out by device F (10) is one of the Bluetooth functions, and this operation identifies what devices are present around device F (10). Here, it is assumed that device F has determined the presence of devices A (11) and B (12) as a result of the first inquiry. When making an inquiry, device F (10) transmits an identification (ID) packet for informing neighboring devices of an inquiry, and in response devices A (11) and B (12) transmit frequency hop synchronization (FHS) packets to device F (10). At that time, device F (10) and devices A (11) and B (12) are not synchronized, and thus one-to-one (device F (10) to device A (11), and device F (10) to device B (12)) packet transmission is carried out.

FIG. 3 illustrates an FHS packet format transmitted to device F (10). The FHS packet is a special control packet indicating an address and transmitter's clock among devices. Referring to FIG. 3, the FHS packet includes 34 parity bits and a 24-bit low address part (LAP) for synchronization. A 24-bit LAP, 8-bit upper address part (UAP), and 16-bit non significant address part (NAP) are fields for an address. There is a 2-bit undefined (UNDEF) field in which no function is designated, and there are bits used for reducing temporal connections according to the present invention. A 2-bit scan repetition (SR) field and a 2-bit scan period (SP) field are for a scan operation, and a 24-bit class of device field is for indicating the kind of device (for example, a printer or a camera). A 3-bit active member_address (AM_ ADDR) is a field for allocating a currently-operating slave to a master in a master-slave relation. A 26-bit CLK27-2 field is for indicating clock information, and a 3-bit page scan mode field is for indicating a page scan operation mode.

Device F (10) stores a name through a temporal connection after identifying an address and UNDEF bits of device A (11), in a step 21 of FIG. 2.

Device F (10) receives an FHS packet transmitted from device A (11), and identifies an address through the LAP, UAP, and NAP fields, and determines whether the name has been changed using the UNDEF. If the UNDEF bit state is the same as that previously stored, that is, the bits have not been incremented, then it is determined that the name is the same as before. If the UNDEF bits have been incremented from a previous value, then it is determined that the name has changed. At present, however, device F (10) has carried out the first inquiry, and UNDEF bits of device A (11) have not incremented.

Device F (10) stores a name through a temporal connection to device A after identifying an address and UNDEF bits of device A. A temporal connection is a state in which a calling party calls and accesses a called party, transmits a necessary link management protocol (LMP) message, receives only wanted information, and then ends the communication. Here, it is assumed that the name of device A (11) is APPLE.

Device F (10) stores a name through a temporal connection after identifying an address and UNDEF bits of device B (12) in a step 22.

Device F (10) receives an FHS packet transmitted from device B (12), and identifies an address through the LAP, UAP, and NAP fields, and determines whether the name has been changed using the UNDEF. At present, device F (10) has carried out the first inquiry, and UNDEF bits of device B (12) have not been incremented.

Device F (10) stores a name through a temporal connection to device B (12) after identifying an address and UNDEF bits of device B (12). Here, it is assumed that the name of device B (12) is ORANGE.

Device F (10) carries out a second inquiry in a step 23.

Here, it is assumed that device F (10) has ascertained the presence of device C (13) in addition to the previous devices A (11) and B (12) as a result of the second inquiry. Device F (10) transmits an ID packet for informing neighboring devices of an inquiry, and in response to this devices A (11), B (12), and C (13) transmit FHS packets.

Device F (10) identifies an address and UNDEF bits of device A (11) in step 24.

Device F (10) receives an FHS packet transmitted from device A (11), and identifies an address through the LAP, UAP, and NAP fields, and determines whether the name has been changed using the UNDEF field.

Device F determines whether the received UNDEF bits of device A (11) have been incremented, in a step 25.

If UNDEF bits of device A (11) have been incremented, device F (10) stores the changed name through a temporal connection to device A, in step 26.

Device F (10) can determine whether there has been a change in the name of device A (11) by determining whether there has been an increment from a previous state when the UNDEF field of device A (11) is checked. After that, device F (10) stores the changed name through a temporal connection to device A (11). Here, it is assumed that the changed name of device A (11) is MELON.

If the UNDEF bits of the received device A (11) are the same, that is, the bits have not been incremented, then device F (10) identifies an address and UNDEF bits of device B (12) without a temporal connection to device A (11), in step 27.

Device F (10) determines whether the received UNDEF bits of device B (12) have been incremented, in step 28.

If the UNDEF bits of device B (12) have been incremented, device F (10) stores the changed name through a temporal connection to device B (12), in step 29.

Device F (10) can determine whether there has been a change in the name of device B (12) by determining whether there has been an increment from a previous state when the UNDEF field of device B (12) is checked. After that, device F (10) stores the changed name through a temporal connection to device B (12).

If the UNDEF bits of the received device B (12) are the same, that is, it they have not been incremented, then device F (10) identifies an address and UNDEF bits of device C (13) without a temporal connection to device B (12), and stores the name through a temporal connection, in step 30.

Device F (10) receives an FHS packet transmitted from device C (13), and identifies an address through the LAP, UAP, and NAP fields, and determines whether the name has changed using the UNDEF. At present, however, device F (10) has identified the presence of a new device C (13) as a result of the second inquiry, and UNDEF bits of device C (13) have not been incremented.

Device F (10) stores the name through a temporal connection to device C (13) after identifying the address and UNDEF bits of device C (13). Here, it is assumed that the name of device C (13) is GRAPE.

Figure 4:
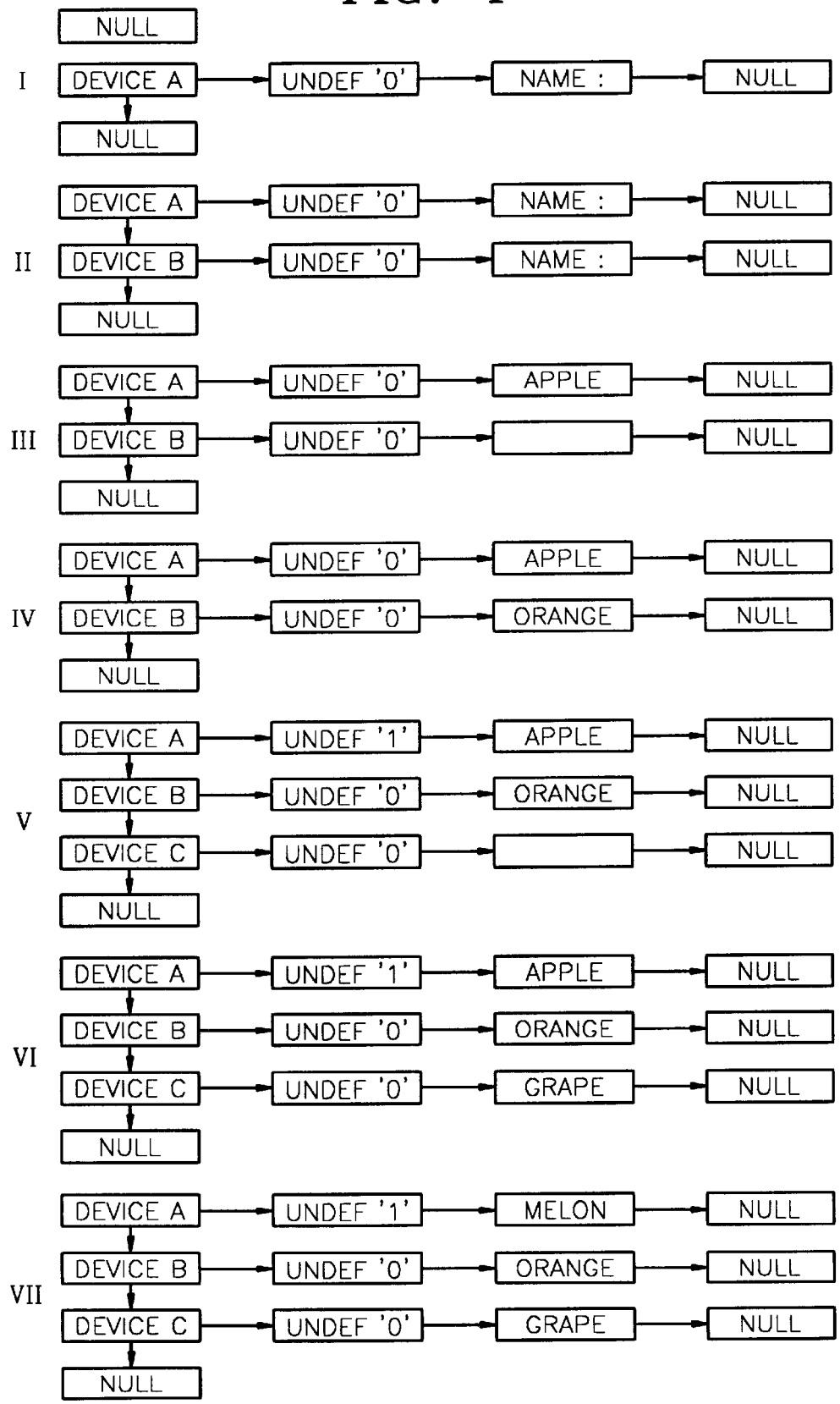
FIG. 4 illustrates an exemplary Bluetooth-map used in the method according to the present invention.

FIG. 4 illustrates a device-map example used in a method for temporal connections set forth above. I and II of FIG. 4 are states in which device F (10) receives FHS packets after ascertaining the presence of device A (11) and device B (12) around device F (10) as a result of the first inquiry.

III and IV of FIG. 4 are states in which device F (10) has stored the names (APPLE and ORANGE) through temporal connections after determining that UNDEF bits of device A (11) and device B (12) have not been incremented.

V of FIG. 4 is a state in which device F (10) determines the presence of device C (13) in addition to device A (11) and device B (12) around device F (10) as a result of the second inquiry. At the same time, device F (10) determines that UNDEF bits of device A (11) have been incremented from the previous state. Here, the UNDEF bits of device B (12) have not changed.

VI of FIG. 4 is a state in which device F (10) determines that UNDEF bits of device C (13) are the same as the previous state, that is, the bits have not been incremented, and stores the name (GRAPE) through a temporal connection.

VII of FIG. 5 is a state in which device F (10) stores the new name (MELON) through a temporal connection to device A (11).

As described above, according to the embodiment of the present invention, blocking temporal connections to Bluetooth devices which have not changed names according to changes in the UNDEF field of FHS packets enables less frequent temporal connections.

It is noted that the present invention is not limited to the preferred embodiment described above, and it is apparent that variations and modifications by those skilled in the art can be effected within the spirit and scope of the present invention defined in the appended claims.

What is claimed is:

1. A method of reducing temporal connections among predetermined wireless telecommunications devices, comprising the steps of:

(a) transmitting inquiry information packets informing inquiry to the predetermined wireless telecommunications devices;

(b) obtaining predetermined device ID and name information from the device information packets received from the predetermined wireless telecommunications devices according to the inquiry information;

(c) checking whether the name information is changed from the obtained predetermined device information packets; and (d) if the name information is changed according to the result of the step (c), obtaining the changed name information by accessing only the device whose name information is changed.

2. The method of claim 1 wherein the step (d) comprises sub-steps of:

(d-1) transmitting a request message to the device whose name information is changed; and (d-2) receiving the changed name information from the device whose name information is changed according to the request message.

3. The method of claim 2, wherein the request message of the step (d-1) is an LMP (link management protocol) message.

* * * * *